(12) United States Patent
Hennig et al.

(10) Patent No.: US 10,592,665 B2
(45) Date of Patent: Mar. 17, 2020

(54) APPARATUS AND METHOD COMPRISING A CARRIER WITH CIRCUIT STRUCTURES

(71) Applicant: Fraunhofer-Gesellschaft zur Foerderung der angewandten Forschung e.V., Munich (DE)

(72) Inventors: Maxim Hennig, Garching bei Muenchen (DE); Oliver Schimmel, Munich (DE); Philipp Zieris, Munich (DE); Bartol Filipovic, Eching (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 367 days.

(21) Appl. No.: 14/867,889

(22) Filed: Sep. 28, 2015

(65) Prior Publication Data
US 2016/0092680 A1  Mar. 31, 2016

Related U.S. Application Data

(63) Continuation of application No. PCT/EP2014/055123, filed on Mar. 14, 2014.

(30) Foreign Application Priority Data

Mar. 28, 2013 (DE) .................. 10 2013 205 729

(51) Int. Cl.
*G06F 21/55* (2013.01)
*G01R 31/28* (2006.01)
(Continued)

(52) U.S. Cl.
CPC .......... *G06F 21/552* (2013.01); *G01R 31/02* (2013.01); *G01R 31/28* (2013.01); *G06F 21/575* (2013.01);
(Continued)

(58) Field of Classification Search
CPC ............. H01L 23/5223; H01L 23/5227; H01L 23/5228; H01L 23/576; G06F 21/86; G06F 21/87; G06F 21/88
See application file for complete search history.

(56) References Cited

U.S. PATENT DOCUMENTS 5,831,531 A * 11/1998 Tuttle ................... G08B 13/126
340/568.2
5,858,500 A   1/1999 MacPherson et al.
(Continued)

FOREIGN PATENT DOCUMENTS

DE    19855209 A1   6/2000
EP    1273997 A2    1/2003
(Continued)

OTHER PUBLICATIONS

Filipovic, Bartol et al., "Schutz Eingebetteter Systeme Vor Produktpiraterie", http://www.aisec.fraunhofer.de/content/aisec/de/pdf/studien/2011-11-15Produktschutz-Studie.pdf, Technologischer Hintergrund und Vorbeugemassnahmen, Nov. 15, 2011, pp. 1-41.
(Continued)

*Primary Examiner* — Tae K Kim
(74) *Attorney, Agent, or Firm* — Perkins Coie LLP; Michael A. Glenn (57) ABSTRACT

An apparatus having a carrier with circuit structures including a complex impedance has a measurement unit implemented to measure the complex impedance of the circuit structures at a first time to get a first result and at a later second time to get a second result. Further, either a control implemented to enable operation of a component or to judge whether unauthorized to the component has taken place in dependence on whether the first result matches the second result, or an interface implemented to transmit the first result and the second result in a wireless or wired manner to such a control are provided.

(Continued)

In that way, specifically embedded systems without integrated security functions can be upgraded with cryptographic routines in a simple and cost effective manner.

20 Claims, 9 Drawing Sheets

(51) Int. Cl.
| | |
|---|---|
| G06F 21/86 | (2013.01) |
| G01R 31/02 | (2006.01) |
| G06F 21/57 | (2013.01) |
| H01L 23/00 | (2006.01) |
| G06F 21/74 | (2013.01) |
| G06F 21/78 | (2013.01) |
| G06F 21/87 | (2013.01) |
| G06F 21/88 | (2013.01) |
| H04L 9/08 | (2006.01) |
| H05K 1/02 | (2006.01) |

(52) U.S. Cl.
CPC .............. *G06F 21/74* (2013.01); *G06F 21/78* (2013.01); *G06F 21/86* (2013.01); *G06F 21/87* (2013.01); *G06F 21/88* (2013.01); *H01L 23/573* (2013.01); *H01L 23/576* (2013.01); *H04L 9/0861* (2013.01); *G06F 2221/034* (2013.01); *H01L 2924/0002* (2013.01); *H05K 1/0275* (2013.01)

(56) References Cited

U.S. PATENT DOCUMENTS

| | | | |
|---|---|---|---|
| 6,047,068 A | 4/2000 | Rhelimi et al. | |
| 6,262,664 B1* | 7/2001 | Maloney | G08B 21/0288 340/572.8 |
| 6,281,793 B1* | 8/2001 | Haimovich | G07C 5/085 340/542 |
| 6,512,454 B2 | 1/2003 | Villa et al. | |
| 6,929,900 B2 | 8/2005 | Farquhar et al. | |
| 6,957,345 B2 | 10/2005 | Cesana et al. | |
| 6,983,378 B1* | 1/2006 | Kokubo | G06F 21/86 713/194 |
| 7,098,792 B1* | 8/2006 | Ahlf | G08B 13/1427 235/492 |
| 7,135,973 B2* | 11/2006 | Kittel | G06K 19/07798 340/568.2 |
| 7,469,126 B2* | 12/2008 | Miettinen | G06K 19/073 340/571 |
| 7,712,674 B1* | 5/2010 | Warner | G06K 19/07749 235/487 |
| 8,169,318 B2* | 5/2012 | Atherton | G06K 19/073 340/572.1 |
| 8,325,042 B1* | 12/2012 | Hyde | G06K 19/07749 340/10.1 |
| 8,427,316 B2* | 4/2013 | Bielas | G06K 19/0739 340/572.1 |
| 8,488,784 B2* | 7/2013 | Schantz | G06F 21/73 380/270 |
| 9,082,057 B2* | 7/2015 | McGregor | G06K 19/07372 |
| 9,552,541 B2* | 1/2017 | Mullis | G06K 19/07749 |
| 2001/0033012 A1 | 10/2001 | Kömmerling et al. | |
| 2003/0005193 A1* | 1/2003 | Seroussi | G06F 21/35 710/107 |
| 2003/0011474 A1* | 1/2003 | Ng | G06K 19/04 340/568.1 |
| 2003/0080735 A1* | 5/2003 | Wache | G01N 27/902 324/235 |
| 2005/0017073 A1* | 1/2005 | Fernandez | G06K 7/0008 235/451 |
| 2006/0087883 A1* | 4/2006 | Ozguz | G06F 21/87 365/185.04 |
| 2006/0231633 A1 | 10/2006 | Farooq et al. | |
| 2006/0284679 A1* | 12/2006 | Roine | H03F 3/193 330/253 |
| 2007/0029384 A1* | 2/2007 | Atherton | G06K 19/073 235/435 |
| 2007/0121575 A1* | 5/2007 | Savry | G06K 19/073 370/351 |
| 2007/0271596 A1* | 11/2007 | Boubion | G06F 21/35 726/3 |
| 2008/0077333 A1* | 3/2008 | Maxey | G08B 13/169 702/34 |
| 2008/0106605 A1* | 5/2008 | Schrijen | G06F 21/60 348/207.99 |
| 2008/0297168 A1* | 12/2008 | Parker | G01R 31/2812 324/538 |
| 2009/0147945 A1* | 6/2009 | Doi | H04L 9/002 380/2 |
| 2009/0167334 A1* | 7/2009 | Fjelstad | H01L 23/13 324/756.06 |
| 2009/0265758 A1* | 10/2009 | Tuyls | G06F 21/31 726/2 |
| 2009/0282259 A1* | 11/2009 | Skoric | G06F 21/35 713/185 |
| 2010/0085075 A1* | 4/2010 | Luzzi | H04L 9/0866 326/8 |
| 2010/0090714 A1* | 4/2010 | Van Geloven | H01L 23/576 324/705 |
| 2010/0127822 A1* | 5/2010 | Devadas | H04L 9/3278 340/5.8 |
| 2011/0254141 A1* | 10/2011 | Roest | H01L 23/576 257/639 |
| 2012/0018288 A1* | 1/2012 | Rollet | G06F 21/83 200/5 A |
| 2012/0057698 A1* | 3/2012 | Schantz | G06F 21/73 380/44 |
| 2014/0299658 A1* | 10/2014 | Houben | G07D 11/0009 232/1 D |
| 2014/0320151 A1* | 10/2014 | Filippi | G06F 21/87 324/679 |

FOREIGN PATENT DOCUMENTS

| | | |
|---|---|---|
| EP | 1670059 A1 | 6/2006 |
| EP | 2405540 A1 | 1/2012 |
| EP | 2426616 A1 | 3/2012 |
| WO | 2007019642 A1 | 2/2007 |
| WO | 2007/116355 A2 | 10/2007 |
| WO | 2011/128778 A2 | 10/2011 |

OTHER PUBLICATIONS

Maes, Roel, "Physically Unclonable Functions: Constructions, Properties and Applications", Arenberg Doctoral School of Science, Engineering & Technology, Dissertation presented in partial fulfillment of the requirements for the degree of Doctor in Engineering, Aug. 2012, pp. 1-260.

Tarnovsky, C, "Deconstructing a secure processor", In: Black Hat DC 2010 (2010), Feb. 2, 2015.

Torrance, Randy et al., "The State-of-the-Art in IC Reverse Engineering", International Association for Cryptologic, Chipworks Inc., 2009, pp. 363-381.

Weco, Vergusstechnik, http://download.wecogroup.com/themen/de/weco_vergusstechnik.pdf.

* cited by examiner

APPARATUS AND METHOD COMPRISING A CARRIER WITH CIRCUIT STRUCTURES

CROSS-REFERENCE TO RELATED APPLICATIONS

This application is a continuation of copending International Application No. PCT/EP2014/055123, filed Mar. 14, 2014, which is incorporated herein by reference in its entirety, and additionally claims priority from German Application No. 10 2013 205 729.6, filed Mar. 28, 2013, which is also incorporated herein by reference in its entirety.

BACKGROUND OF THE INVENTION

The present invention relates to apparatuses and methods enabling judgement whether unauthorized access to a component has taken place, in dependence on whether a measurement regarding circuit structures provides an expected result.

Nowadays, protective seals or copy protection systems exist in many variations and for different fields of application. However, this rarely prevents copying or cloning of electronic products, since breaking a seal or bypassing a copy protection can mostly only be proven visually and locally. Additionally, deactivation of the functionality of the product after breaking of a seal is mostly not realized or can easily be bypassed by reverse engineering measures.

Due to their application specific optimization, frequently at the suspense of protection mechanisms, embedded systems are susceptible to product piracy, where the product is copied without much effort or even reproduced one-to-one. In a product teardown, a product counterfeiter will disassemble the system bit by bit into its individual parts and identify the used parts and will then perform system analysis and reproduce a circuit having the same or equivalent parts. The necessitated firmware can be read out from the original and imported in the reproduction, as described in [6] and [2]. The firmware is the actual core element of the system. The same brings the product to life and, thus, normally includes most of the know-how. Thus, protecting the firmware is frequently given priority.

Known protection mechanisms try, for example, to prevent product teardown by removing labelings and inscriptions on the used individual parts, for example by removing the same by laser or by casting the circuit with opaque epoxide resin, polyurethane resin or silicon rubber as described in [8]. However, this measure can easily be bypassed by lifting off the casting compound by chemical processes. If an attacker has an x-ray device at his disposal, he can read out chip inscriptions through the casting compound and the chip housing as described in [2].

A further known protection method is the shielding technology as described, among others, in [2] and [9]. Here, a grid of conductive traces is spanned directly across an area of a circuit or a component worth protecting. Severing the grid is detected by the underlying circuit, whereby the application is deactivated by deliberately destroying the firmware as described in [4], [1] and [3]. A serious problem with this procedure is that the protective device necessitates energy supply. In the absence of any energy supply, the detection mechanism is inactive and the application cannot be deactivated. A first remedy is provided by the usage of cryptographic keys from the resistances as known from [10]. However, the grid can be removed or bridged in order to gain direct access to the system as described, for example, in [7]. Additionally, ohmic resistances can basically also be readout or measured easily, respective protective circuits can be removed and replaced by other resistors of identical values, which reduces the effect of the protective circuit.

Nowadays, simple password queries, trusted platform modules, security components, so-called secure elements or dongle solutions are used for impeding the step of system analysis. This realizes linkage of the firmware to a hardware anchor and makes an exact one-to-one copy of this system more difficult. These measures can increase the protection but cannot completely prevent manipulation of the system, since security queries in the firmware can be manipulated or skipped, interfaces to the components to be protected are not sufficiently secured or software emulators simulate the presence of a dongle, as described in [2].

Further known protection mechanisms for embedded systems are physical unclonable functions, PUFs, described in [5]. The idea behind this mechanism is the protection of hardware and software by measuring and digitally evaluating production tolerances, which are subsequently used as identification numbers and/or cryptographic keys. This information is unique for each component and cannot be copied or reproduced, wherein PUFs can be optically or electrically evaluated and verified. Manipulation protection is given by PUFs in that the physical characteristics change with an attack in a tuned system, for example when opening an IC, and thus distort the extracted information.

Currently, however, the usage of electronic PUFs is mostly limited to IC components and not the whole printed circuit board. The same are deposited directly onto the chip before the same is finally packaged into a housing. Thus, the production costs are often quite high, since the automated CMOS processes have to be interfered with. Systems already within use or individual microcontrollers can often only be upgraded or refitted by a redesign of the overall system with these security features which enormously increases the costs for their application.

Further potential security gaps when using microcontrollers occur due to their debugging and programming interfaces via which the firmware can be read out and manipulated. This is particularly problematic in systems using external memory modules for storing the firmware. By using reworking solder equipment, these memory modules can be soldered out and read out with a Flash programming device.

These solutions for protecting embedded systems offer individual and isolated measures such as manipulation detection in the form of shielding or copy protection in the form of binding the firmware to the hardware anchor. A solution in the direction of a combination of manipulation detection and copy protection is the usage of PUFs. However, PUFs act only passively in response to manipulations since merely the unique information is lost. Additionally, they are inflexible and cost intensive to produce.

SUMMARY

According to an embodiment, an apparatus may have: a carrier with circuit structures including a complex impedance; a measurement means implemented to measure the complex impedance of the circuit structures at a first time to get a first result, and at a later second time to get a second result; either a control implemented to enable operation of a component or to judge whether unauthorized access to the component has taken place, in dependence on whether the first result matches the second result, or an interface implemented to transmit the first result and the second result in a wireless or wired manner to such a control.

According to another embodiment, a method may have the steps of: measuring a complex impedance of circuit structures on a carrier at a second time to get a second result; and enabling operation of a component or judging whether unauthorized access to the component has taken place, in dependence on whether the second result matches a first result measured at a first time.

Embodiments provide an apparatus, comprising:

a carrier with circuit structures having a complex impedance;

a measurement means implemented to measure the complex impedance of the circuit structures at a first time to get a first result and to measure the same at a later second time to get a second result;

either a control implemented to enable operation of a component or to judge whether unauthorized access to the component has taken place in dependence on whether the first result matches the second result, or an interface implemented to transmit the first result and the second result in a wireless manner to such a control.

The core idea of the present invention is the finding that by measuring complex impedances of a circuit deformation of the line structures and not only line breakage can be determined. Deformation of a circuit structure already results in measurably changed impedance values such that already from this a manipulation that does not damage the line structures can be detected.

This invention is advantageous in that the protective device cannot be bypassed, not even in a switched off state, and can be produced in a cost effective manner. The same prevents that possibly existing software or critical information can be readout in an unencrypted manner since, even in a deactivated or currentless state, data worth protecting are in an encrypted state.

According to an embodiment, a component worth protecting is provided with a carrier with circuit structures and connected to a measurement means which is able to measure the complex impedance of the circuit structures residing on the carrier at different times and to enable, based on the results of the measurements, a control to enable operation of the component worth protecting or to judge whether unauthorized access has taken place. Specifically, a carrier with circuit structures covers a microcontroller comprising an internal RAM and an internal Flash memory together with its debugging and programming interfaces. The necessitated circuit for measuring a complex impedance of the circuit structures on the carrier is, like the microcontroller, also below the carrier on a printed circuit board. Merely a specifically protected programming interface can be used without manipulating the carrier. This interface allows programming of the microcontroller but not reading out of stored data. Thus, all critical areas, in this case represented by the memory modules, are protected.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
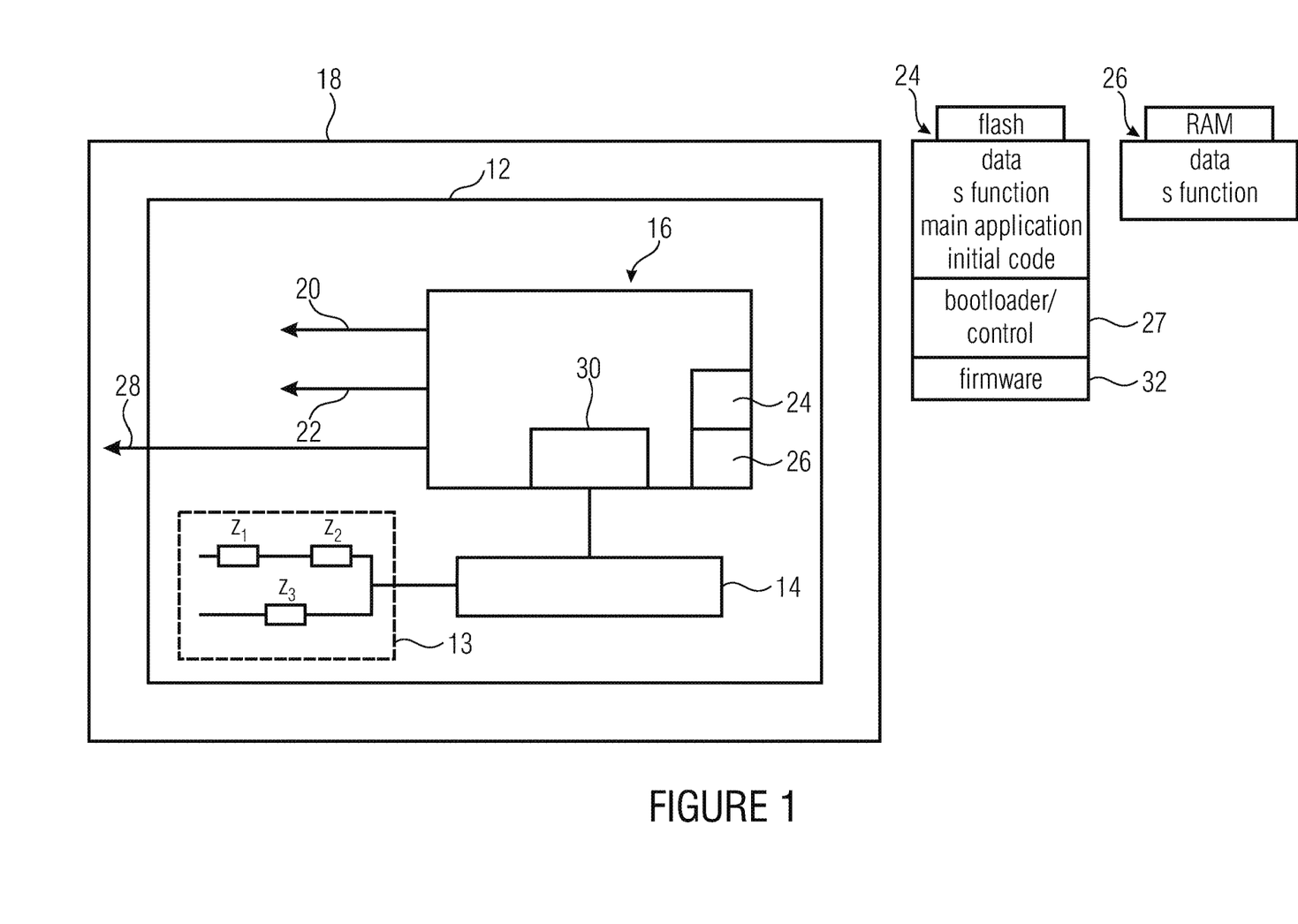
FIG. 1 shows a schematic top view of an apparatus having a microcontroller covered by a carrier with circuit structures.

FIG. 1 shows an apparatus 10 having a carrier 12 with circuit structures 13 having a complex impedance. A simple implementation is possible, for example in the form of deposited conductive traces separated from one another by a dielectric and serving as electrodes for capacitance measurements. The carrier 12 with circuit structures 13 having a complex impedance covers a measurement circuit 14 for sensing the characteristics of the carrier 12 in the form of the complex impedance values and the component illustrated as being protective in the form of a microcontroller 16 arranged on a printed circuit board 18. The microcontroller 16 including the firmware worth protecting can be implemented from a standard class having no protective function against reading out of the firmware. Further, the microcontroller 16 comprises a JTAG (Joint Task Action Group) interface 20 and an ISP (In System Programmer) interface 22 which can be used for reading out the Flash memory 24 and the RAM memory 26. Here, however, the same are also below the carrier 12 with circuit structures 13 and are hence not accessible from the outside.

Apart from or as an alternative to the standard communication interfaces, further communication interfaces can be provided, for example USB interfaces. Further, the microcontroller 16 comprises a secure programming interface sISP (secure In System Programmer) 28 allowing the transfer of code to the microcontroller 16, but no read-out of the memory modules 24 and 26. Flash and RAM memory 24 and 26 are arranged within the microcontroller 16.

The essential components of the firmware 32 are stored in the flash memory 24. The same consist of a control also including a cryptographic means for encrypting and decrypting, initial code, a main application, functions to be protected and/or further data. The control 27 can be realized as bootloader which is also stored in the flash memory 24 of the microcontroller and can be invoked by specific instructions. If the program of the microcontroller 16 is reset or updated, the control 27 will have, initially, during the programming process of the flash memory 24, the task of deriving a first cryptographic key from the foil characteristics. For this, the analog measurement values of the measurement circuit 14 are converted by the analog-to-digital converter 13 within the microcontroller 16 and derived based on a rule of the cryptographic keys. Subsequently, the microcontroller 16 receives a program and/or data, for example the main application, via the sISP interface, encrypts the received data and/or the program completely or partly with the derived first cryptographic key to subsequently store the same in the flash memory 24.

If the program is subsequently executed by the microcontroller 16, first, the control 27 in the form of the bootloader will be enabled. At first, the same generates a second cryptographic key from the current characteristics of the carrier 12 with circuit structures 13 or the complex impedance values measured by the measurement circuit 14 and rendered by the analog-to-digital converters 30. With this second cryptographic key, the microcontroller 16 decrypts the encoded data within the flash memory 24. The decoded data are stored in the RAM memory 26 and processed from there.

If the carrier 12 with circuit structures 13 has been manipulated during programming of the microcontroller 16 and executing the program, for example peeled away, bent, damaged or destroyed, the impedance values of the circuit structures 13 on the carrier have altered or changed due to the manipulation.

The changed impedance values have the effect that the control 27 produces another second cryptographic key different to the first cryptographic key generated during encryption. With this second cryptographic key based on changed impedance values, the microcontroller 16 and the control 27, however, are not able to correctly decrypt the encrypted data from the flash memory 24, since the first and second cryptographic keys differ from one another, such that the overall structure only functions correctly when the carrier 12 is intact and not manipulated. Thus, the system 10 can determine a manipulation at the carrier 12 with circuit structures 13. Further, it does not matter whether the carrier 12 is manipulated in the switched-off state or during the operation of the microcontroller 16, the key information gets lost with any manipulation of the carrier 12.

If the encrypted data become unusable due to manipulation, a person having the code in plain text or the manufacturer of the device can deposit a new carrier and reinstall the program and thus enable operation of the system again.

After peeling off the carrier 12, the Firmware 32 can be read out but the same is encrypted, such that the code does not exist in plain text. The control 27 can comprise both a function implemented in software, which is executed by a computing unit, such as the microcontroller 16, as well as dedicated hardware, such as an FPGA or AISIC with control function provided therein. Further components can be arranged below the carrier with circuit structures 12, depending on what components are to be protected from a manipulation attempt. Further, it is possible that the control 27 is an independent component receiving the data of the circuit structures 13 of the carrier 12 in a wired or wireless manner, for example via an RFID module.

FIG. 1 shows the implementation of a copy and manipulation protection suitable for embedded systems. The measurement means 14 is implemented to measure the impedances of the circuit structures 13 at a specific time or to provide the circuit structures 13 of the carrier 12 with voltage curves varying in amplitude and/or frequency and to receive the system response of the circuit structures 13 over a period of time. For providing the circuit structures 13 with varying voltage curves, the circuit structures can comprise, for example, electric signal lines or wires to which the voltage curves are applied. Basically, Instead of the wires, any other type of electrically analyzable sensors can be installed in the foil. Instead of measuring the impedance at a specific time, by measuring the system response over a period of time, as it is the case, for example, in a challenge response method, additional degrees of freedom can be obtained for generating a cryptographic key. Changes of the applied voltage curves, such as in amplitude or frequency, cause different system responses of the circuit structures 13. A structure where the applied voltage curves for the system excitation are introduced by an external device is also possible. In this case, reading out a state of the carrier 12 requires the knowledge of the correct excitation signal.

In order to be able to detect manipulations of the foil as precisely as possible, the circuit structures 13 can be designed in a manner sensitive to mechanical influences, such as bending or stretching and changes of the electronic characteristics, such as puncturing the circuit structures 13 or the carrier 12 with measurement needles.

Instead of encrypting all data from the flash memory 24 during execution of the bootloader, parts of the data can also be decoded only during operation. If the protective membrane is removed or manipulated during the running operation of the device, it can happen that sensitive data, such as components of already decrypted firmware 32 or cryptographic keys, are still temporarily stored in the RAM memory 26 and can be read out or manipulated. For eliminating this problem, the impedance measurements can be repeated in regular intervals that are as short as possible. When detecting strong deviations, the apparatus reacts with a power reset of the microcontroller 16 or the control 27 for deleting temporary data from the RAM memory 26.

The value of a complex impedance comprises a real part and an imaginary part and is formed by a combination of a resistive part and an inductive part and/or a combination of a resistive part and a capacitive part of an electric circuit or a portion of an electric circuit. A purely ohmic resistance comprises an impedance having a real part unequal to zero and an imaginary part equal to zero and thus represents a one-dimensional quantity. Circuit structures having an inductive or capacitive portion have an impedance with an imaginary part unequal to zero such that, instead of the one-dimensional quantity, the ohmic resistance, a two dimensional quantity, the complex valued impedance, states the ratio of voltage and current of a part of an electric circuit or the circuit. A measurement circuit of the previous and the following embodiments is implemented to measure the complex valued impedance of circuit structures and hence to sense the real part and the imaginary part of the impedance of the circuit structures.

In embodiments, circuit structures can meander inside or outside the carrier. By resistance effects of the line lengths and a dielectric lying between the meander portions, e.g. air or the material of the carrier, capacitive effects can arise in the circuit structures which can result in a measureable complex-valued impedance of the circuit structures. Furthermore, capacitances can be formed between a substrate, e.g. a printed circuit board or the conductors arranged thereon and the circuit structures formed on or within the carrier. Alternatively or additionally, it is possible that the conductors of the circuit structures are implemented partly or over their entire extension such that the complex impedance also comprises inductive parts, for example when conductors of the circuit structures are arranged in or on the carrier in the form of a coil instead of a meander shape.

Further, the carrier with circuit structures can serve as shielding against interception attacks on data lines from outside and can also output, with respective implementation, a suitable response signal to a specific physical excitation. This allows unambiguous verifiability of the authenticity and integrity of the deposited foil.

A great advantage of this invention is the combination of a secure storing option for cryptographic keys or unambiguous identifications as well as a readout, manipulation and copy protection for the firmware and the overall system.

Figure 2:
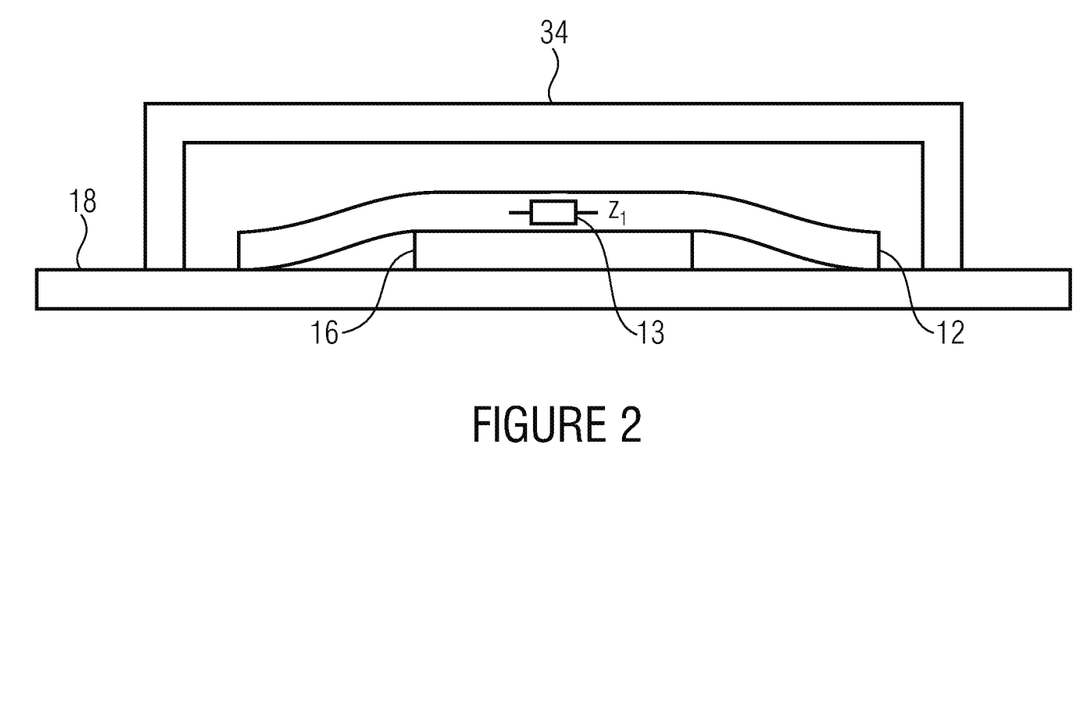
FIG. 2 shows a cross-sectional view of an apparatus where the carrier is covered by a further protective layer.

FIG. 2 shows a schematic cross-section of an apparatus having a printed circuit board 18 whereon a microcontroller 16 is arranged. The microcontroller 16 is covered by the carrier 12 with circuit structures 13 and is implemented analogous to FIG. 1. Additionally, a protective means 34 is arranged above the carrier in order to protect the carrier 12 and hence the measured impedance values from influences and/or changes during normal operation. The protective means 34 can have a heat reflecting or opaque characteristic for protecting the material of the carrier 12 from premature aging and can be implemented in such a stiff manner that unintentional contact of the protective means 34 does not result in deformation of the circuit structures 13 and, hence, changed impedance values, for example during maintenance of a device.

The protective means 34 can be formed in the form of a housing or a lid and can be arranged at a distance to the carrier 12. However, it is also possible that the protective means 34 is arranged directly on the carrier 12 in the form of a foil. Here, the foil can be implemented in such a stiff manner that either slight contact does not cause any relevant change of the impedance values of the circuit structures 13 or that the carrier 12 is merely protected from environmental influences, such as light and temperature, by the protective means 34, but contact results in a change of the impedance values of the circuit structures 13.

In embodiments, the carrier can be implemented in the form of a foil and can be attached via a region having several components worth protecting such that access from the outside to one or several of the components to be protected without deformation of the carrier is prevented. The carrier with circuit structures can consist of different materials. Among others, the same can be implemented in a flexible manner such that the same can be attached to uneven surfaces or to components varying in height.

The described type of encrypting data has the advantage that the cryptographic key itself is not or does not have to be stored in the system. The same is derived from the state of the carrier 12 or the impedances of the circuit structures 13 and, consequently, cannot be corrupted or read out.

After having presented an embodiment with a microcontroller 16 and memory modules 24 and 26 integrated therein in the above statements, the following embodiments show a microcontroller 16 having an external flash memory 24 where unauthorized access is prevented by an electronic membrane in the form of a carrier 12 with circuit structures 13.

Figure 3:
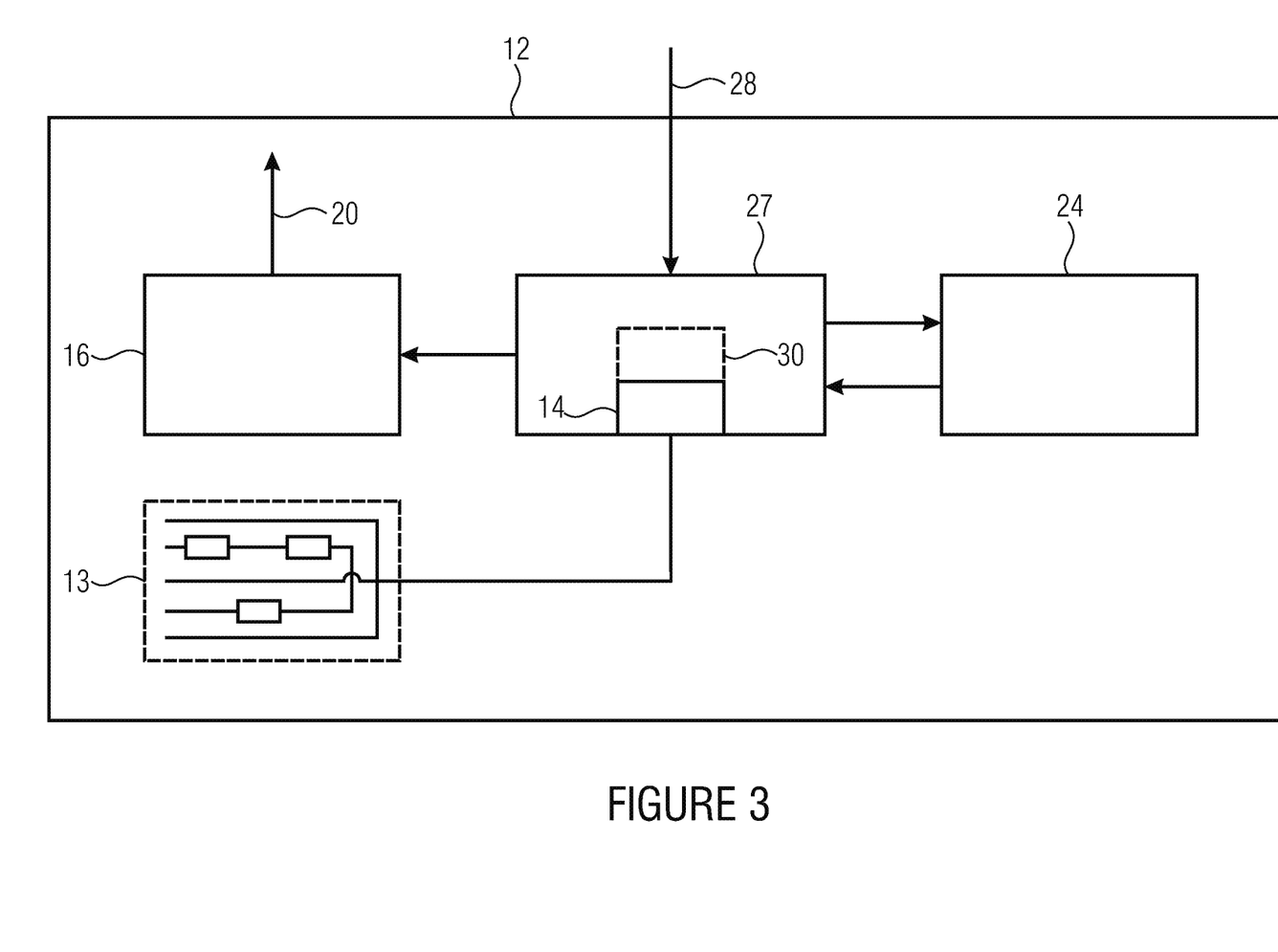
FIG. 3 shows a schematic illustration of an apparatus having an external memory element.

FIG. 3 shows an embodiment with an external flash memory 24. The carrier 12 covers the microcontroller 16, the JTAG interface 20 comprised by the same as well as the control 27 and a flash memory 24 arranged spaced apart from the microcontroller 16 and the control 27. The measurement circuit 14 and the analog-to-digital converter 30 are realized as part of the control 27. The measurement circuit 14 is part of the module of the control 27 and provides the measurement results to the analog-to-digital converter 13 implemented as part of the control software. The entire apparatus communicates only via the secure programming interface 28 with other devices. All other security critical communication interfaces and lines, such as between the flash memory 24 and the control 27, are covered by the carrier 12 and inaccessible from outside.

Apart from the impedances, the circuit structures 13 can comprise further signal lines that can be provided by the control 27 with signals varying in amplitude or frequency in order to be able to perform a challenge response method and to extend, as stated above, the range of results of the measurement circuit 14.

The flash memory 24 includes data to be processed by the microcontroller 16 and communicates indirectly with the same via the control 27. Via the secure programming interface 28, the control 27 is able to receive data and programs for the flash memory 24 or the microcontroller 16. Reading out the flash memory 24 or the data or programs on the microcontroller 16 via the interface 28 is, however, prevented. If the control 27 receives data via the secure programming interface 28, the control 27 encrypts the same with a first cryptographic key, which the same derives from the impedance values of the circuit structures 13 provided by the measurement circuit 14 and stores the same in the encrypted state in the flash memory 24. If the microcontroller 16 needs data from the flash memory 24, the control 27 generates a second cryptographic key from the characteristics of the circuit structures 13, decodes the necessitated data from the flash memory 24 therewith and transfers same to the microcontroller 16, wherein both the data lines from the flash memory 24 to the control 27 and from the control 27 to the microcontroller 16 are covered by the carrier 12 and protected from unauthorized access. If the carrier 12 or the circuit structures 13 are manipulated, the measurement values provided by the measurement circuit 14 will change, consequently the second cryptographic key, which then differs from the first cryptographic key, which prevents correct decoding of the data from the flash memory 24. The second cryptographic key is changed in the moment of manipulation, independent of a switched-on or switched-off state of the apparatus. The encrypted code can be read out from the flash memory 24 after manipulation, but since the manipulation has destroyed the key information of the circuit structures 13, the data do not exist in plain text.

The arrangement of a memory external to microcontroller 16 shown in FIG. 3 offers a number of advantages. The internal memory of a component worth protecting can be extended in a simple manner which is particularly attractive for cost reasons. However, the additional external memory is protected from unauthorized access by the carrier 12 to the same extent as the microcontroller 16, without the necessity that the external flash memory 24 itself has to comply with a specific security class.

Figure 4:
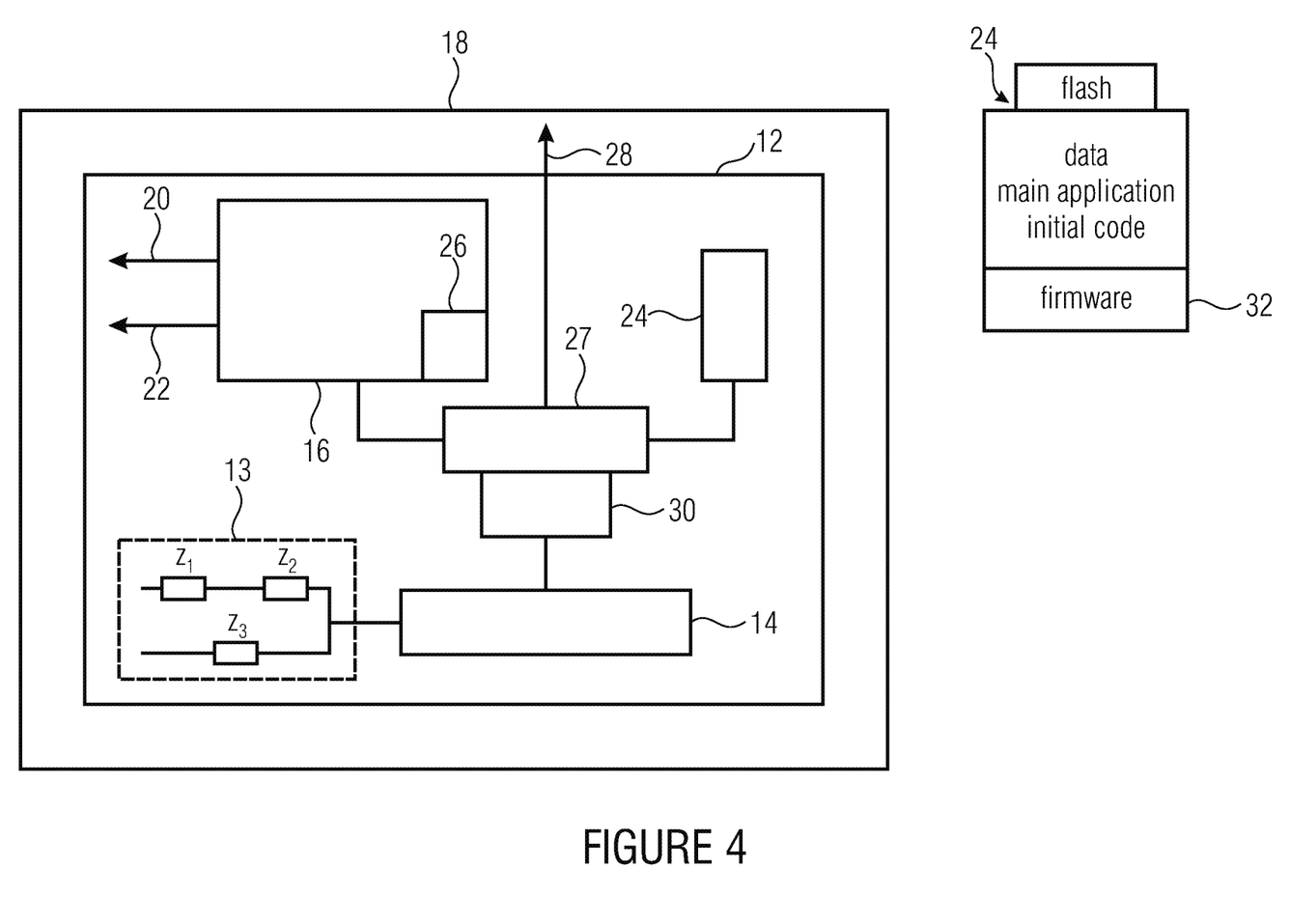
FIG. 4 shows a top view of a device where the memory modules are arranged separately from a microcontroller and a measurement circuit is arranged separately from a control.

FIG. 4 shows a schematic illustration of a circuit disposed on a printed circuit board 18 and comprising a microcontroller 16 with integrated RAM memory, a control unit 27 with analog-to-digital converter 30 processing measurement values provided by the measurement circuit 14, a separate flash memory 24 which is accessed by the control 27 and a secure programming interface 28. The microcontroller 16 is represented as a microcontroller without specific protective functions and comprises a JTAG interface 20 and an ISP interface 22. All components of the circuit, with the exception of the secure programming interface sISP 28, are covered by the carrier 12 with circuit structures 13. The flash memory 24 includes all data and/or program sequences in an encrypted state. The control 27 can be realized, for example, by a FPGA (Field Programmable Gate Array) or an ASIC (Application Specific Integrated Circuit).

Firmware and/or other data worth protecting received via the secure programming interface 28 are encrypted by the control 27 with a first cryptographic key, which same derives from the impedance values of the circuit structures 13 provided by the measurement circuit 14. At run time, data and/or code sequences necessitated by the microcontroller 16 are read out by the control 27 from the flash memory 24 and decrypted with a second cryptographic key. The control 27 provides the decoded data and/or code sequences to the microcontroller 16. The data lines from the flash memory 24 to the control 27 and from the control 27 to the microcontroller 16 are covered by the carrier 12 with the circuit structures 13, such that the data transmitted from the control 27 to the microcontroller 16 in plain text are protected from access until manipulation of the carrier takes place. In the case of manipulation, the impedance values of the circuit structure 13 change, which prevents decoding and tapping of decrypted data. At run time, data transmission from the flash memory 24 to the microcontroller 16 is performed via the control 27. By transmitting the data in plain text, the control 27 is transparent for the microcontroller 16. It is an advantage of this embodiment that merely those parts of unencrypted code and/or unencrypted data used at the current run time by the microcontroller 16 are in the RAM memory 26 of the microcontroller at one time. When a manipulation is detected, the same might be deleted, for example, by a dedicated action of the microcontroller, for example power reset or restart.

Compared to the above embodiment, this embodiment has a higher level of security, since data stored in the flash memory 24 can be completely encrypted. Alternatively, only parts of the data may be encrypted.

The actual functionality and intelligence of an embedded system can frequently be found within the firmware 32. For preventing misuse and for protecting the firmware 32 against manipulations and reading out of the memory 24 or 26, protecting the memory 24 or 26 against reading out the firmware 32 is desirable. Here, two systems having different levels of security can be realized, as shown by FIG. 1 and FIG. 4. Here, the embodiment of FIG. 4 has the higher level of security of the two embodiments. The system consists of a microcontroller 16 having an internal RAM memory 26 and an external flash memory 24. This alternative is more resource-intensive since all data is encrypted, in FIG. 1, due to performance and resource optimization, only part of the firmware 32 is stored in an encrypted manner in the RAM memory 26, since only code to the extent of the RAM memory 26 can be decrypted at a time. If the program in the RAM memory 26 is processed and if a further program block is necessitated by the microcontroller 16, the program part in the RAM 26 has to be discarded in order to be able to decrypt the new one.

While temporary memory used by the microcontroller is described as RAM memory in the previous and in the following embodiments, such a temporary memory can also be implemented in the form of registers or other temporary memories.

Figure 5A:
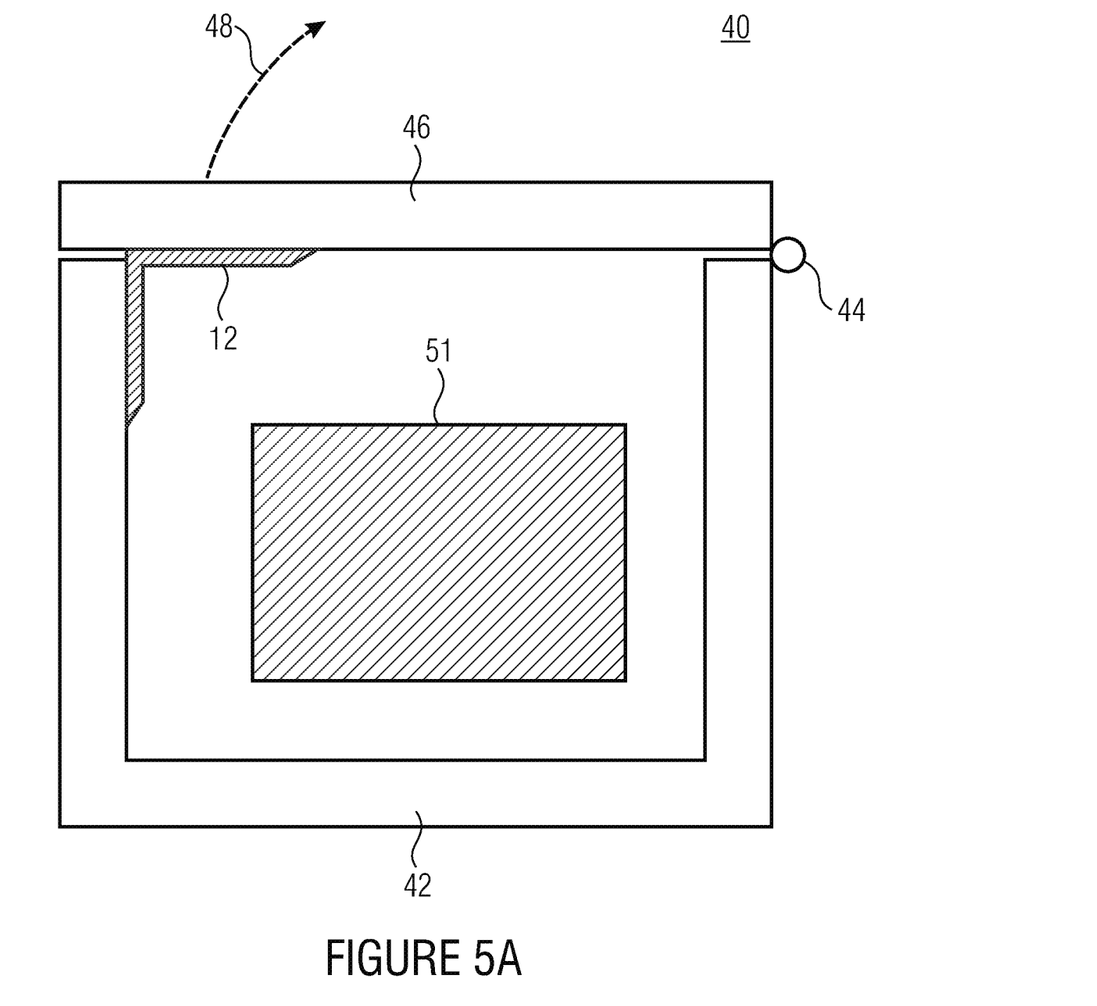
FIGS. 5A and 5B show schematic views of an electronic seal system.

FIG. 5a shows the schematic illustration of an apparatus 40 having an electronic seal system. A housing lid 46 is arranged at a housing body 42 via a hinge 44, such that the housing lid can be opened in the direction 48. For registering an opening of the housing lid 46, a carrier 12 with circuit structures 13 is arranged on the inside of the housing between the housing body 42 and the housing lid 46 arranged movable thereto. If the lid 46 is moved in the direction 48, the resulting gap between housing body 42 and the housing lid 46 will result in a deformation of the carrier 12 and hence to a change of the impedance values of the circuit structures 13. Such an apparatus can, for example, be used for determining whether a housing 42/46 has been opened between a first time, for example shipment, and a second time, for example, delivery or maintenance, and, hence, the seal has been broken. When the impedance values of the circuit structures 13 on the carrier 12 are read out at the first time and are stored in some type of key, this value can be compared to impedance values read out at a second time.

It is also possible that equipment or a circuit 51 arranged inside the housing makes an action conditional on whether the measured impedance values of the circuit structures 13 change. Active parts in the housing 42/46, for example, can be switched to a voltage-free state. It is also possible that opening the housing 42/46 results in deleting sensitive data or that this result is stored in a memory of a component inside the housing 42/46.

Figure 5B:
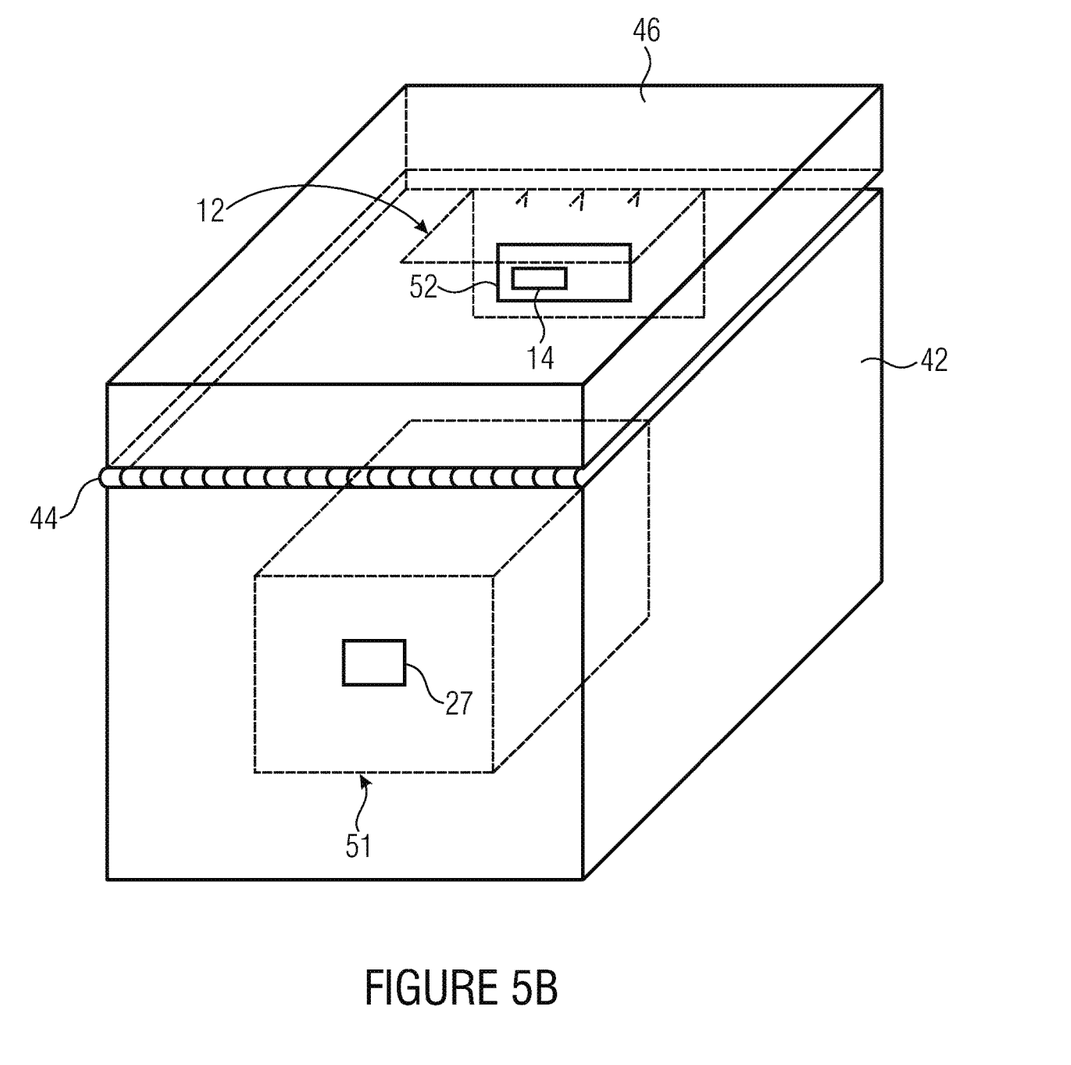

FIG. 5b shows a schematic inside view of the apparatus 40 having a carrier 12 with circuit structures 13, which includes an RFID tag 52 containing the measurement circuit 14 and being able to communicate with equipment 51 within the housing body 42 and/or another type of electronic system and to communicate the measured impedances of the circuit structures 13 of the carrier 12 to the same. The equipment 51 includes the control 27 for evaluating the impedance values. If the equipment 51 has network access, the same can inform, when the seal is broken, other network participants or possibly an administrative unit about the detected break of seal. This can take place such that the housing formed by the housing base body 42, the hinge 44 and the housing lid 46, is, for example, a shipping container and the electronic equipment 51 informs the sender and/or recipient of the container when the container has been opened in an unauthorized manner. Further possible fields of application are, for example, novel electricity meters or smart meters allowing state control of the sealing in the form of the carrier 12 via remote access. Manipulation at the carrier 12 can be detected both locally and remotely.

Basically, it is possible that communication of an equipment 51 takes place via any type of communication channel. For example, this can be a network terminal, a radio and/or other wireless connection. Manipulation or break of seal can be queried by other communication partners via a communication means or can be communicated to the same independent from an external query which can save time.

Although the communication between RFID tag 52 and equipment 51 and/or another type of electronic system has been represented as wireless communication path, the communication can basically also be implemented in a wired manner.

Additionally, this invention allows protection of the know-how within the firmware 32 by specific reactions to a break of seal which are not limited only to visual and local detections but which can also actively counteract. Additionally, seal violations can also be recorded for allowing later dating of the event or the events.

Figure 6:
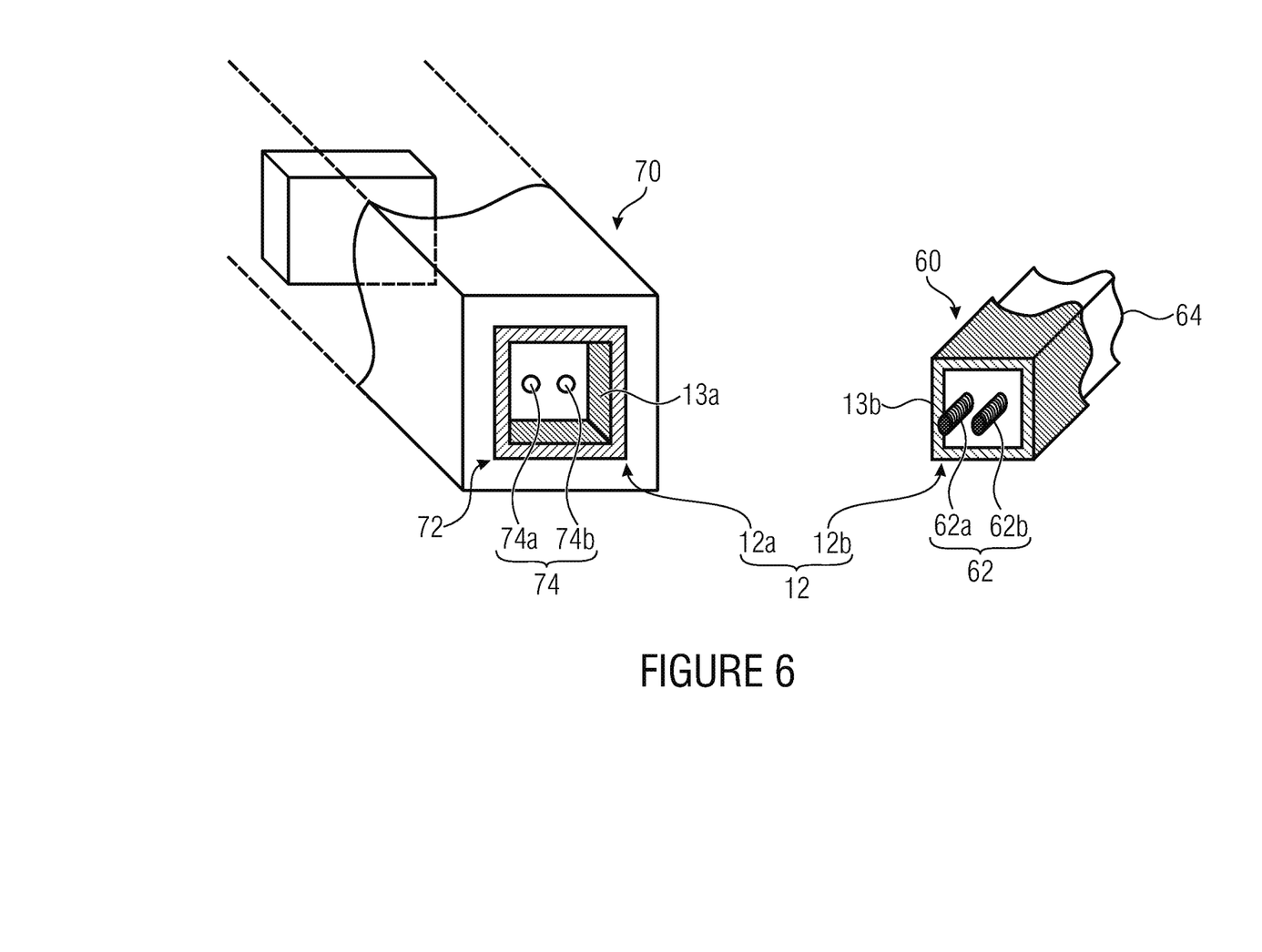
FIG. 6 shows schematic views of an electronic contact detection.

FIG. 6 shows a system 70 and the usage of the carrier 12 with circuit structures 13 as electronic contact detection. For this, a connector jack 72 is coated with the carrier 12a and the circuit structures 13a, whose impedance values are measured by an evaluation electronics 14 within the system 70. If a connector 64 with its connector contacts 62 is then introduced into the jack housing 72 with the jack contacts 74, the electronic characteristics of the circuit structure 13a, which reside on the carrier 12a, will change due to the mechanical contact, which might lead to slight stretch marks. Then, an authorized person can calibrate the overall system 70 to the current state of the circuit structures 13a on the carrier 12a and thereby activate the overall system 70. Removing and reintroducing the connector 64 causes, due to renewed mechanical stress of the carrier 12a, a renewed change of the measured impedance values. An unauthorized person is not able to perform the calibration, since he or she does not own the necessitated data in plain text. Alternatively or additionally, a carrier 12b can reside at the connector 64 and/or at the connector contacts 62, which allow determination whether the connector has been introduced into an unauthorized system between a first and a second time.

The carrier material can be implemented as foil or membrane or can be realized in another way. In the case of a connector jack 72 and/or a connector contact 62, the arrangement of the carrier 12 can also include an implementation of the carrier as volume body, where the connector 64 or the connector jack 72 are completely or partly formed of the carrier material. In particular, in the form of a foil or membrane, a carrier 12 can also be integrated subsequently into a system after a production of a component at any time.

Figure 7A:
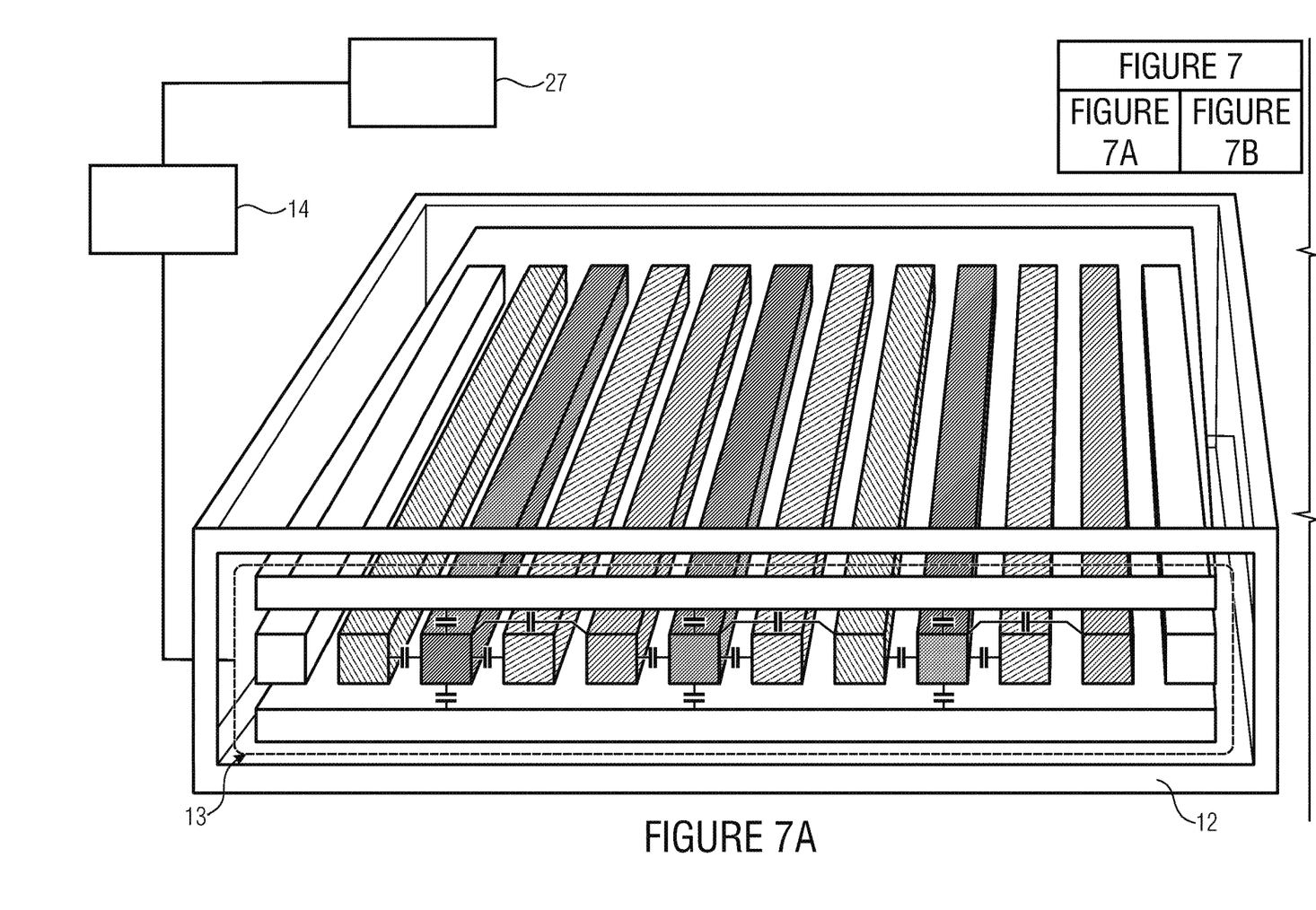
FIGS. 7A and 7B show schematic cross-sectional illustrations of circuit structures embedded into the material of a carrier.
Figure 7B:
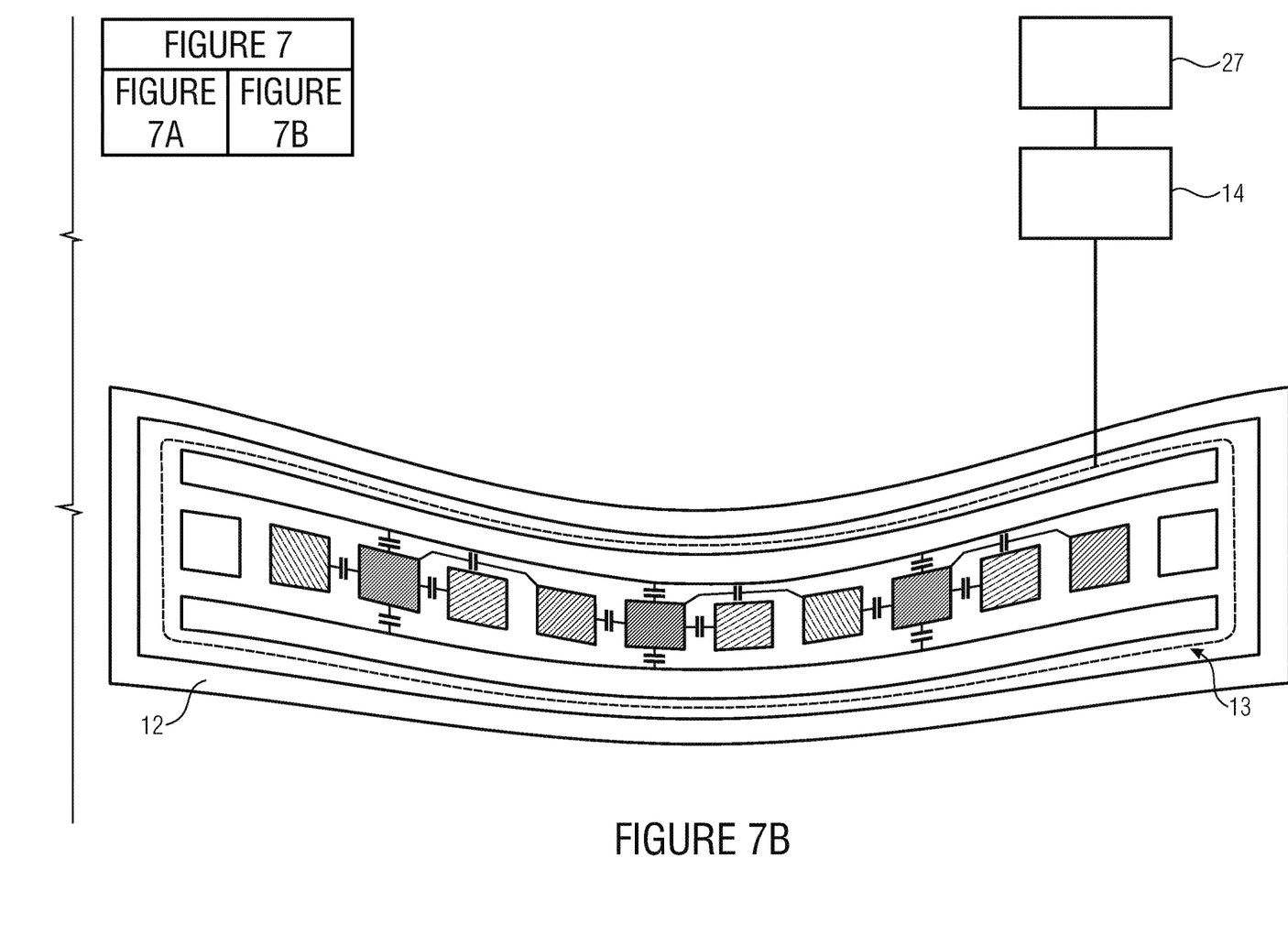

FIGS. 7a and 7b each show a representation of a carrier 12 with circuit structures 13, wherein the circuit structures 13 are embedded into the material of the carrier 12 and whose impedance values are provided to the control 27 via the measurement circuit 14. If the arrangement of the conductive traces of the circuit structure 13 with respect to one another changes due to deformation, as illustrated in FIG. 7b, the impedance values sensed by the measurement circuit 14 between the individual conductive traces will also change.

Embedding the circuit structures 13 into the material of the carrier 12 can be advantageous in order to prevent accidental damages of the conductive traces, for example due to contact during assembly. As an alternative to FIG. 7, the circuit structures 13 can also be arranged at the carrier 12.

Although it has been illustrated in FIG. 1 that in the case of a manipulation of the carrier 12 the data stored in the memory devices 24 and 26 becomes unusable, since no cryptographic key suitable for decryption can be generated any more, it is also possible that a noticed manipulation at the carrier 12 triggers other and/or further actions, such as a restart or a power reset of the microcontroller 16 in order to also delete the RAM memories 26 where unencrypted data may be stored. Other actions are also possible, such as a restart of the component worth protecting in a safe mode where no decrypted program sequences or data are necessitated, to maintain at least elementary or possibly security-relevant functions of an overall system.

Although the microcontroller has been described in the above embodiments merely with JTAG or ISP interfaces, the microcontroller can also include other interfaces for programming or reading out memory modules that can be protected by a carrier with circuit structures.

While in the above embodiments merely one secure programming interface for programming the memory modules has been described as being accessible without manipulation of the carrier, further communication interfaces can also be used without manipulating the carrier. However, these further interfaces allow no access to application data, such that reading out data worth protecting is also prevented in that case.

In some fields of applications it can be advantageous to structure the circuit structures residing on the carrier differentially, to possibly obtain a greater independence of the results of the impedance measurements from temperature variations. It is also possible that the circuit structures residing in or on the carrier are implemented in the form of printed electrodes. Due to the surface characteristics of the carrier material that are difficult to reproduce and the edges of the electrodes slightly running in the printing process and the resulting different impedance values of the circuit structures, this method can result in a further diversification of the cryptographic keys.

For a further increase of the diversification of the possible cryptographic keys, it is also possible that conductive and non-conductive granulate is introduced into the carrier material forming the carrier. The arbitrarily distributed different conductivities result in varying permittivities across the area of the carrier and possibly to local short circuits of parts of the circuit structures. Both effects cause identical circuit structures to have impedance values that differ from one another.

In other words, embodiments of the described protective system can comprise the following primary components that can serve to realize the protective mechanism: a first primary component, a carrier that can be implemented as a protective foil with circuit structures and impedances integrated therein.

The protective foil can comprise deposited or integrated circuit structures with complex impedances. Ideally, the carrier consists of flexible plastic that can be adapted to the shape of the devices to be protected.

The impedances can be realized by a suitable combination of conductive, semiconductive or insulating devices. When using the protective device in an environment prone to interferences, the electrodes can be provided with a protective shielding for increasing the reproducibility of the measurement values.

For producing the carriers with circuit structures, the technologies of printable electrodes are useful. Due to the hardly reproducible surface characteristics of the carrier material and the associated arbitrary distribution of the electronic ink during printing or the subsequent post-treatment steps, the same have great production tolerances which increase the individuality of each carrier with circuit structures. Additionally, by using roller to roller printing processes, the production costs can be drastically reduced compared to CMOS processes as they are necessitated for PUFs.

A second primary component, the measurement circuit, is realized such that the same can sense the impedances of the circuit structures to be measured. The impedance results from the resistance, the capacitance and inductance of the circuit.

A third primary component, measurement data rendering, for example in the form of an analog-to-digital converter serves, on the one hand, to digitalize the measurement values, and, on the other hand, to stabilize the same by suppressing environmental noise and other undesired interference signals. Measurement rendering can be realized in software by means of a microcontroller with analog-to-digital converter and by means of an interference suppression algorithm. If higher performance and security requirements prevail, measurement data rendering can also be realized in an FPGA or ASIC. The primary components key generation and data encryption can then be integrated in this component together with measurement data rendering.

A fourth primary component, key generation, uses the evaluation of the capacitive characteristics of the carrier. When using impedance measurements, the circuit structures are excited by the signal generator circuit and the sensed and rendered measurement data are evaluated by means of a specific algorithm. Here, this mechanism acts like a "challenge response method": the excitation by the signal generator circuit is transmitted to the circuit structures as challenge, which reacts depending on the input signal and membrane characteristics with the respective system response. In this case, not only the state of the carrier has to be changed but also the waveform to be input has to be known for generating a correct cryptographic key at a second time.

Like measurement data rendering, key generation can also be realized in software for cost reasons or in hardware—FPGA or ASIC—for performance reasons.

A fifth primary component, data encryption, serves to completely or partially encrypt the firmware input into the microcontroller and is part of the control performing data transmission to processors and memories.

A sixth primary component, data encryption, refers to the unit where the encrypted data are decrypted again for executing the application and can be implemented as part of the control.

A seventh primary component, the communication interface, offers the option of externally querying the state of the carrier, intact or damaged, as long as the device to be protected is operated within a network. When the carrier is manipulated, the program worth protecting cannot be decrypted correctly due to a wrong key extraction. Thereupon, only an emergency application is started, which informs the other participants within the network about the manipulated hardware.

If an attacker wants to reach the firmware of the protected system, first, he will have to gain access to the interfaces below the carrier. If the attacker tries to remove or bypass the carrier, he will automatically change the geometrical and hence simultaneously the dielectric characteristics of the circuit structures within or at the carrier and will destroy the original cryptographic key or the identification.

After removing or manipulating the membrane, the firmware can be read out, but the same is, however, stored in the flash memory in an encrypted or partially encrypted manner and is hence unusable for the attacker.

Application options for this invention can be found in all electronic devices where company know-how worth protecting is to be stored in a memory. Thus, the range is from entertainment electronics and mobile communication to medical technology and electrically regulated industrial plants up to control devices in a vehicle. All of these products can be reproduced, copied or manipulated when the same do not have adequate integrated protective mechanisms like the invention presented herein.

Further, when used as a seal, the application can be applied in product tracking or manipulation detection.

Elementary usage options of the invention are listed below:
manipulation detection,
copy protection,
unambiguous identification,
individualization and personalization,
storage or generation of cryptographic keys for symmetric and asymmetric encryption methods,
prevention of opening of housings,
prevention of removal of system parts, for example plug connections.

The invention provides the foundation for a basic technology for establishing a secure distributed production environment, since not only components but also data lines and memories can be protected from manipulation and unauthorized access. The manipulation protection allows secure networking, since information processing and storage are already protected in the system component.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] U.S. Pat. No. 6,512,454 B2
[2] Bartol Filipovic, Oliver Schimmel: Schutz eingebetteter Systeme vor Produktpiraterie—Technologischer Hintergrund and Vorbeugemaßnahmen/Fraunhofer AISEC, 11 2011—Forschungsbericht. http://www.aisec.fraunhofer.de/content/aisec/de/pdf/studien/2011-11-15Produktschutz-Studie.pdf 1,2
[3] U.S. Pat. No. 6,929,900 B2
[4] U.S. Pat. No. 5,858,500
[5] Maes, Roel: Physically Unclonable Functions: Constructions, Properties and Applications, Katholieke Universiteit Leuven—Faculty of Engineering, Dissertation, 08 2012. http://www.cosic.esat.kuleuven.be/publications/thesis-211.pdf
[6] R. Torrance, D. James: The State-of-the-Art in IC Reverse Engineering. In: Clavier, Christophe (editor); Gaj, Kris (editor): Cryptographic Hardware and Embedded Systems CHES 2009: 11th International Workshop Lausanne, Switzerland, Sep. 6-9, 2009, Proceedings, Berlin, Heidelberg: Springer-Verlag 2009 (Lecture Notes in Computer Science 5747) S. 363-381, Invited Talk 3
[7] Tarnovsky, C.: Deconstructing a secure processor. In: Black Hat DC 2010 (2010)
[8] Weco: Vergusstechnik. http://download.wecogroup.com/themen/de/weco_vergusstechnik.pdf
[9] U.S. Pat. No. 6,957,345 B2
[10] U.S. Pat. No. 6,047,068

The invention claimed is:

1. Apparatus, comprising:
a carrier with circuit structures comprising a complex impedance, wherein a component to be protected, at least a further component and data lines therebetween are covered by the carrier with circuit structures;
a measurement unit implemented to measure the complex impedance of the circuit structures at a first time to get a first result, and at a later second time to get a second result;
a control implemented to enable operation of the component to be protected or to judge whether unauthorized access to the component to be protected has taken place, in dependence on whether the first result matches the second result;
wherein the control is implemented to delete data from a temporary memory of the apparatus when a further result does not match the first or a previous result,
wherein the control is implemented to derive a first cryptographic key from the first result and/or to derive a second cryptographic key from the second result, and
wherein the control further comprises a cryptographic unit implemented to use the first cryptographic key to encrypt a program or data to be stored to the component to be protected in an encrypted manner, and/or to decrypt an encrypted program stored on the component to be protected section by the selected or completely with the second cryptographic key.

2. Apparatus according to claim 1, wherein the measurement unit is implemented to provide the circuit structures with voltage curves varying in amplitude and/or frequency and to receive the system response of the circuit structures.

3. Apparatus according to claim 1, wherein the carrier and the circuit structures comprise such a flexibility that the carrier with the circuit structures can be mounted on an uneven surface of the component to be protected.

4. Apparatus according to claim 1, wherein the carrier is arranged in the shape of a foil covering areas of the component to be protected, such that access to the areas to be protected from the outside without deforming the carrier is prevented.

5. Apparatus according to claim 1, further comprising a secure programming interface implemented to receive the program or the data prior to encrypting the same with the first cryptographic key, wherein reading out the unencrypted program or the unencrypted data via the secure interface is prevented; wherein the secure programming interface allows a transfer of code to the control.

6. Apparatus according to claim 1, wherein the carrier represents an electronic seal, and wherein the control is configured to judge, in dependence on whether the first result matches the second result, whether the electronic seal has been broken.

7. Apparatus according to claim 6, wherein the carrier is arranged above a first part of the component to be protected and a second part of the component to be protected that are movable relative to one another.

8. Apparatus according to claim 1, wherein the carrier comprises an RFID module.

9. Apparatus according to any of the previous claims, wherein the measurement unit is implemented to repetitively measure the impedance of the circuit structure for receiving further results, and wherein the control is implemented to prompt a restart or a power reset of the component to be protected when a further result does not match the first or a previous result.

10. Apparatus according to claim 1, wherein a circuit comprising the circuit structures of the carrier is structured differentially to receive a differential signal.

11. Apparatus according to claim 1, wherein the circuit structures are realized by printed electrodes.

12. Apparatus according to claim 1, wherein conductive granulate is introduced into a carrier material forming the carrier and adjacent to the circuit structures.

13. Apparatus according to claim 1, wherein the apparatus comprises a communication interface implemented to communicate, to communication partners of an overall system, a mismatch between a measurement and a previous measurement with respect to the impedance values of the carrier with circuit structures.

14. Apparatus according to claim 1, wherein a protective unit is provided above the carrier, which his implemented to protect the carrier and hence the measured impedance values from influences and/or changes during normal operation.

15. Apparatus according to claim 1, comprising a connector and a connector jack, wherein the carrier is formed at the connector and/or the connector jack, and wherein a plugging process of the connector with the connector jack can be detected by the control based on changed measurement values of the measurement unit due to the changes at the carrier material and/or at the circuit structure caused by the plug-in or plug-out process.

16. Apparatus according to claim 12, wherein the conductive granulate leads to arbitrarily distributed different conductivities that result in local short circuits of parts of the circuit structures.

17. Apparatus according to claim 7, wherein the first part and the second part are parts of a housing.

18. Apparatus according to claim 6, comprising a circuit that is configured to, when having network access, inform other network participants or an administrative unit that the further result does not match the first or the previous result.

19. Method, comprising:
measuring a complex impedance of circuit structures on a carrier at a second time to get a second result, wherein a component to be protected, at least a further component and data lines therebetween are covered by the carrier with circuit structures;
enabling operation of the component to be protected or judging whether unauthorized access to the component to be protected has taken place, in dependence on whether the second result matches a first result measured at a first time; and
deleting data from a temporary memory when the second result does not match the first or a previous result,
wherein the control is implemented to derive a first cryptographic key from the first result and/or to derive a second cryptographic key from the second result, and
wherein the control further comprises a cryptographic unit implemented to use the first cryptographic key to encrypt a program or data to be stored to the component to be protected in an encrypted manner, and/or to decrypt an encrypted program stored on the component to be protected section by the selected or completely with the second cryptographic key.

20. Apparatus, comprising:
a carrier with circuit structures comprising a complex impedance;
a measurement unit implemented to measure the complex impedance of the circuit structures at a first time to get a first result, and at a later second time to get a second result;
a control implemented to enable operation of a component or to judge whether unauthorized access to the component has taken place, in dependence on whether the first result matches the second result;
wherein the carrier represents an electronic seal, and wherein the control is configured to judge, in dependence on whether the first result matches the second result, whether the electronic seal has been broken;
wherein the carrier is arranged above a first part of the component and a second part of the component that are movable relative to one another;
wherein the control is implemented to delete data from a temporary memory of the apparatus when a further result does not match the first or a previous result,
wherein the control is implemented to derive a first cryptographic key from the first result and/or to derive a second cryptographic key from the second result, and
wherein the control further comprises a cryptographic unit implemented to use the first cryptographic key to encrypt a program or data to be stored to the apparatus in an encrypted manner, and/or to decrypt an encrypted program stored on the apparatus section by section or completely with the second cryptographic key.

* * * * *

UNITED STATES PATENT AND TRADEMARK OFFICE
CERTIFICATE OF CORRECTION

PATENT NO. : 10,592,665 B2
APPLICATION NO. : 14/867889
DATED : March 17, 2020
INVENTOR(S) : Maxim Hennig et al.

It is certified that error appears in the above-identified patent and that said Letters Patent is hereby corrected as shown below:

In the Claims

Claim 1, Column 14, Line 60 should read as: ...to be protected section by section or completely ...

Claim 14, Column 15, Line 46 should read as: Apparatus according to claim 1, wherein a protective unit is provided above the carrier, which is implemented to protect the carrier and hence the measured impedance values from influences and/or changes during normal operation.

Claim 19, Column 16, Line 29 should read as: ... to be protected section by section or completely ...

Signed and Sealed this
Seventeenth Day of August, 2021

Drew Hirshfeld
*Performing the Functions and Duties of the
Under Secretary of Commerce for Intellectual Property and
Director of the United States Patent and Trademark Office*